No. 785,633. Patented March 21, 1905.

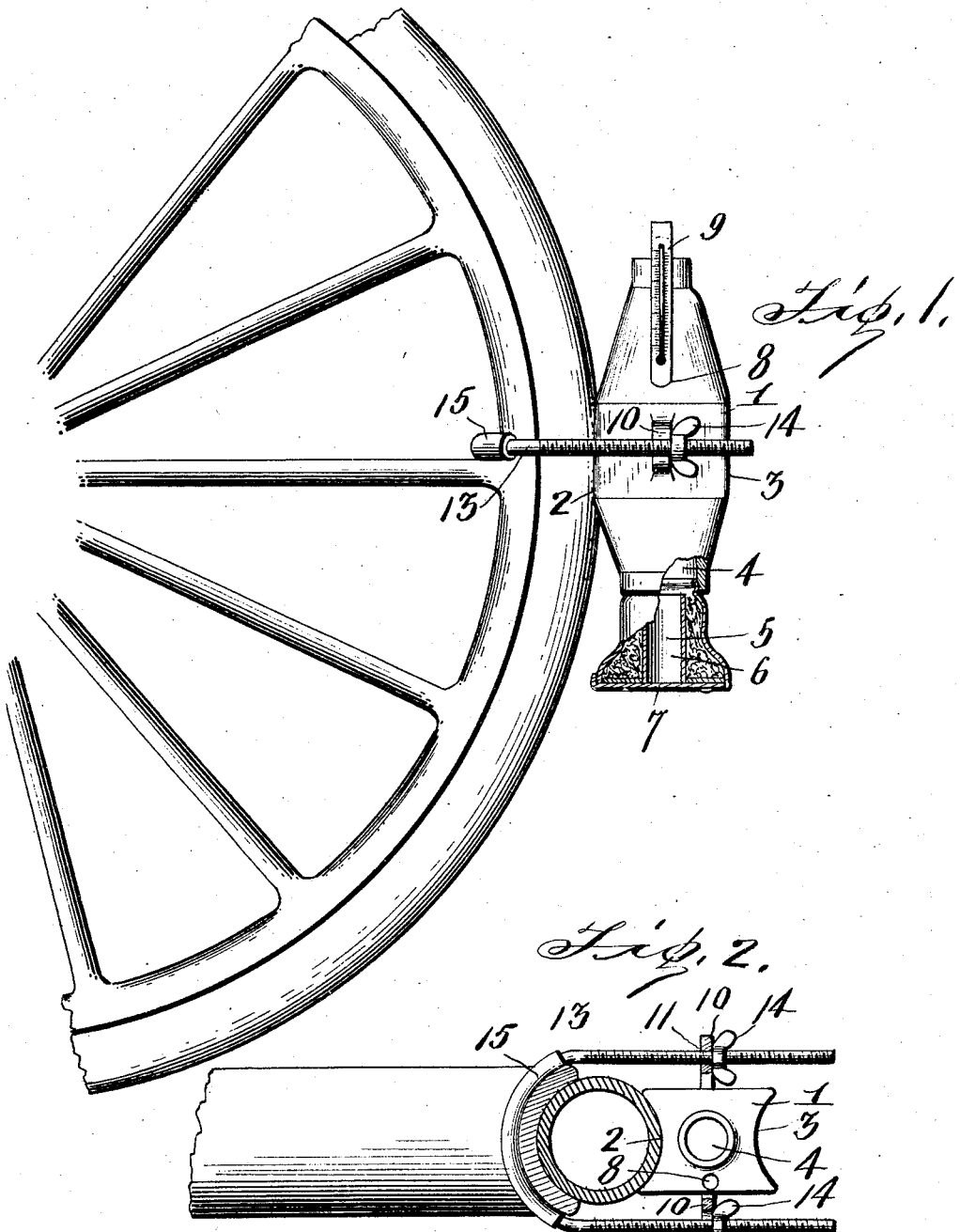

UNITED STATES PATENT OFFICE.

JAMES MILLARD PADGETT, OF TOPEKA, KANSAS.

RUBBER-TIRE REPAIRER.

SPECIFICATION forming part of Letters Patent No. 785,633, dated March 21, 1905.

Application filed April 2, 1904. Serial No. 201,208.

*To all whom it may concern:*

Be it known that I, JAMES MILLARD PADGETT, a citizen of the United States, residing at Topeka, in the county of Shawnee and State of Kansas, have invented certain new and useful Improvements in Rubber-Tire Repairers; and I do declare the following to be a full, clear, and exact description of the invention, such as will enable others skilled in the art to which it appertains to make and use the same.

My invention is an improved device for repairing rubber tires, such as are used on automobile, bicycle, buggy, or any other kind of rubber-tired wheels, without the necessity of removing the tires from the wheels; and it consists in the construction and combination of devices hereinafter described and claimed.

The object of my invention is to provide an improved device of the class indicated which is exceedingly cheap and simple, is very easily operated, is entirely efficient, and may be readily attached to a wheel and held in operative relation to the tire thereof to effect a repair thereon.

In the accompanying drawings, Figure 1 is a side elevation, partly in section, of a rubber-tire repairer embodying my invention, showing the same in operative position on a wheel the rubber tire of which is in process of repair. Fig. 2 is a top plan view of the same, the wheel being indicated in cross-section.

My improved tire-repairer is a vulcanizer, which may be applied directly to the rubber tire to be repaired and is here shown as a body 1 of suitable size and shape, made of suitable metal, and having opposite sides 2 3, hollowed to fit on tires which vary in size. The sides 2 3 may be varied in shape as may be required to cause them to fit any form of tire, as will be understood. The body has a vertical opening 4 extending entirely therethrough and forming a flue therein. This flue contracts upwardly, as indicated in Fig. 1. A lamp 5 is here shown as detachably fitted in the lower end of the flue and as having a central draft-tube 6, the lower end of which may be uncovered or covered to any desired extent by a damper 7. This lamp serves to heat the body of the vulcanizer, as will be understood. Any other suitable means—as, for instance, a gas jet or burner—may be employed to heat the vulcanizer-body, and I do not limit myself in this particular.

In one side of the vulcanizer-body is an upwardly-opening recess 8, in which a thermometer 9 may be placed to indicate when the vulcanizer-body has been heated to the required extent to make the same effective.

The sides of the vulcanizer, between the sides 2 3 thereof, are provided with oppositely-extending arms 10, one of which has an opening 11 extending transversely therethrough, the other arm having an open slot 12 at its outer end.

In order to secure the vulcanizer-body in place against a rubber tire while the latter is on the wheel, I provide a U-shaped yoke 13, having threaded arms to be passed through the openings in the arms 10 and provided with winged nuts 14. The intermediate portion of the yoke bears against the inner side of the felly of the wheel and is preferably provided with a tubular rubber cushion 15 to prevent it from marring the wheel. It will be understood that the yoke enables the vulcanizer-body to be readily and securely attached to a wheel of any size.

To mend a tire, the cut or hole therein is coated with cement and filled with crude rubber. The vulcanizer is then secured to the wheel and caused to bear against the damaged portion of the tire, and is heated by means of the lamp or other suitable device to the temperature of about 250° Fahrenheit and maintained at such temperature for about twenty-five minutes. This incorporates the crude rubber with the stock in the tire, vulcanizes it, and completely fills the cut or opening therein, rendering the tire as good as it was before being injured I do not desire to limit myself to the precise construction and arrangement of devices herein shown and described, as it is evident that modifications may be made therein without departing from the spirit of my invention and within the scope of the appended claims.

Having thus described my invention, what

I claim as new, and desire to secure by Letters Patent, is—

1. A device of the class described comprising a body formed with a flue extending therethrough from end to end, said body having one side, at a point between its ends, formed to fit against the work.

2. A device of the class described comprising a body having its end portions tapered, said body having a flue extending therethrough from end to end, and having one of its sides, at a point between the tapered ends, formed to fit against the work.

3. A device of the class described, comprising a body having a flue extending therethrough from end to end and having one of its sides, at a point between its ends, formed to fit against the work, and a heating device, at one end of the body, having a flue forming a prolongation of the body-flue.

4. A device of the class described comprising a body formed with a flue extending therethrough from end to end, and having one of its sides, at a point between its ends, formed to fit against the work, and a heating device at one end of the body having a flue forming a prolongation of the body-flue, and a damper, substantially as described.

5. A device of the class described comprising a body formed with a flue extending therethrough from end to end, having one of its sides, at a point between its ends, formed to fit against the work, and further formed with an inclined side converging upwardly toward one end of the flue and an upwardly-opening recess in said side, to receive a thermometer, substantially as described.

6. A rubber-tire repairer comprising a vulcanizer-body to fit against a rubber tire and having a flue, and further provided with oppositely-extending arms, and a yoke to engage the inner side of a wheel-felly and having arms connected to the arms of the vulcanizer-body, the latter being adjustable on and detachable from the arms of the yoke.

In testimony whereof I have hereunto set my hand in presence of two subscribing witnesses.

JAMES MILLARD PADGETT.

Witnesses:
E. F. BARTLETT,
F. E. GRIMES.